Patented Sept. 17, 1940

2,215,382

UNITED STATES PATENT OFFICE 2,215,382

PROCESS AND PRODUCT FOR SOFTENING RUBBER

Arthur E. Warner, Akron, Ohio, assignor to The C. P. Hall Company, Akron, Ohio, a corporation of Ohio No Drawing. Application June 30, 1936, Serial No. 88,187

9 Claims. (Cl. 260—761)

This invention relates to an improved process for softening rubber and to novel softening agents for use in carrying out the process. More particularly the invention relates to the softening of crude rubber prior to the milling thereof.

The preparation and vulcanization of rubber stock are two of the major items involved in the manufacture of rubber products. In preparing such stock it is, of course, customary to mill the rubber to render it more plastic, and it is common practice to incorporate certain softening agents with the rubber, which agents enable the stock to be more readily worked, and which assist in the subsequent molding and curing operations. A number of such agents have been employed, particularly for incorporation in the rubber during the milling thereof whereby the pressure from the mill rolls may be utilized to assist in forcing the agent into the rubber, but all of the softening agents known to me prior to my discovery have certain shortcomings. For example, either their plasticizing effect is of low order, or they are poor dispersing agents, or they fail properly to penetrate and combine with the rubber. Accordingly, it is an object of this invention to provide softening agents which will overcome the disadvantages referred to and another object is to improve the process for treating rubber by incorporating my agents therein.

Moreover, since it is unsatisfactory in most rubber factories to incorporate the softening agent in the rubber for the first time at the mill, such factories are desirous of obtaining softening agents which can be readily soaked up by a batch of rubber, termed a master batch or non-productive, whereby a predetermined amount of the non-productive can be incorporated into crude rubber during milling thereof, thereby eliminating the disadvantages which occur when the softening agent is added for the first time during the milling operation. It is, therefore, a further object of this invention to provide a rubber softening agent, an appreciable amount of which can be absorbed by the rubber by immersing the latter in the agent.

Other objects and advantages will become apparent from the following description.

I have discovered that certain bituminous materials, viz., certain wood tar products, certain coal tar products and certain asphalts, when combined with suitable fatty acids, produce improved rubber softening agents which have excellent dispersion qualities, their plasticizing effect is very high, and they will readily combine with and penetrate rubber at elevated temperatures. The bituminous materials are relatively inexpensive and are valuable because of their very excellent dispersion qualities and their neutrality toward accelerators, antioxidants, etc., but they lack the ability per se properly to penetrate the rubber. However, since the fatty acids, in addition to having good dispersion qualities, also have the ability to carry the bituminous materials into the rubber, such fatty acids can be properly called activators of penetration, and when combined in solution with the bituminous materials, a superior rubber softening agent is obtained.

As an example of my softening agents, I take a wood tar product, such as would be obtained in the destructive distillation of wood, preferably having a viscosity of from 2 to 12, Engler, at 212° F., and a specific gravity of from 1.00 to 1.12. Preferably, but not necessarily, the wood tar product also should have a volatile content not to exceed 3% when heated five hours at a temperature of 325° F. in an open container under conventional laboratory procedure. With this product I preferably incorporate approximately an equal amount by weight of a fatty acid or combination of fatty acids. The fatty acid may be either of animal, vegetable or fish origin, i. e., stearic acid and myristic acid (animal), palmitic acid and lauric acid (vegetable) and jecoric acid (fish), have all been found to be satisfactory in use. In fact, all of the saturated fatty acids of high molecular weight appear to be satisfactory. The wood tar product and fatty acid are readily soluble and form a solution which is a very high grade rubber softening agent. It is not essential that equal amounts of the fatty acid and wood tar product be combined, in fact, the amount of acid may be increased substantially at will, but the amount of tar product cannot be permitted to go much over 50% without sacrificing some of the penetrating quality of the combination. Proportions of about 5% tar product and about 95% fatty acid will give some measure of success, but I prefer substantially equal amounts for best results.

Example 2.—Instead of a wood tar product, I can also use a coal tar product, such as would be obtained in the destructive distillation of coal, having a viscosity, a specific gravity and a volatile content within the ranges given for the wood tar product, and add thereto preferably an equal amount by weight of one or more of the fatty acids referred to. Here again the proportions may be varied as explained in connection with the first example.

Example 3.—In place of the tar products, I can also use an asphalt, preferably such as would be obtainable in the still residues from oil cracking stills, also preferably having a viscosity, a specific gravity and a volatile content within the ranges given in the previous examples. Again preferably an equal amount by weight of one or more of the fatty acids referred to is added to the asphalt to thereby provide an excellent rubber softening agent. These proportions also may be varied in the same manner as previously explained, i. e., the asphalt content should not go much over 50%, but the acid content may. I have also used asphalts having a greater viscosity than 12, Engler, at 212° F. but such asphalts require the use of a greater amount of fatty acid, and while the resulting product produces a suitable softening agent, it is not as satisfactory as a fifty-fifty combination by weight of fatty acid and asphalt within the given viscosity range, the latter combination, therefore, being preferred. A suitable asphalt for my purpose is disclosed in U. S. Patent No. 1,611,436, granted December 21, 1926.

*Example 4.*—It is also possible to combine some of the asphalt of the kind referred to and either a wood tar or coal tar product or both of the kind specified, and add thereto one or more of the fatty acids mentioned. The proportions preferably are 25 parts by weight of an asphalt, 25 parts by weight of a tar product and 50 parts by weight of a fatty acid, but these may be varied as long as the combined asphalt and tar product does not go much above 50%.

The products obtained in the four examples given are very fine rubber softening agents but I can further improve their penetrating qualities, if desired, by adding thereto from 3% to 10% by weight of pine tar oil which is readily soluble in the solution produced. This pine tar oil could properly be termed an adjunct activator.

In carrying out my improved process, I take washed, undried, crude rubber and immerse same in any of my softening agents at a temperature substantially above the boiling point of water for usually less than 10 minutes. The high temperature drives off practically all of the water content and the rubber will readily absorb from 35% to 40% of the agent to its own weight. This amount of softening agent usually makes the rubber too soft for use as a whole and accordingly this rubber is known as a master batch from which any desired quantity is obtained for subsequent incorporation with crude rubber stock which has not been subjected to the action of the softening agent. Obviously the amount of rubber taken from the master batch in each instance for incorporation with the crude stock will depend upon the purpose for which the final rubber product is to be used.

As before stated, my improved softening agents have excellent dispersion qualities and readily penetrate and combine the rubber with no harmful effect to the rubber or to any of the ingredients incorporated therein such as accelerators, antioxidants, etc.

It will be apparent that modifications of the invention may be resorted to without departing from the spirit thereof or the scope of the subjoined claims.

What is claimed is:

1. A rubber softening agent consisting of a bituminous material having a viscosity between 2 and 12, Engler, at 212° F., a specific gravity between 1.00 and 1.12 and a volatile content not to exceed 3% at 325° F., and at least an equal amount of a saturated fatty acid of high molecular weight, in which the fatty acid serves as an activator of penetration for the bituminous material.

2. A rubber softening agent consisting of a bituminous material selected from the group consisting of a wood tar product, a coal tar product and an asphalt, each having a viscosity of between 2 and 12, Engler, at 212° F., a specific gravity between 1.00 and 1.12 and a volatile content not to exceed 3% at 325° F., and at least an equal amount of a fatty acid selected from the group consisting of stearic acid, palmitic acid, myristic acid, lauric acid and jecoric acid, in which the fatty acid serves as an activator of penetration for the bituminous material.

3. The method of treating crude coagulated rubber and the like which comprises incorporating therein prior to milling a solution of a bituminous material and at least an equal amount of a fatty acid of high molecular weight, said fatty acid serving as an activator of penetration for the bituminous material.

4. The method of treating crude coagulated rubber and the like which comprises incorporating therein prior to milling a solution of a bituminous material selected from the group consisting of a wood tar product, a coal tar product and an asphalt, and at least an equal amount of a fatty acid selected from the group consisting of stearic acid, palmitic acid, myristic acid, lauric acid and jecoric acid, said fatty acid serving as an activator of penetration for the bituminous material.

5. The method of treating crude coagulated rubber and the like which comprises incorporating therein prior to milling a solution of a bituminous material selected from the group consisting of a wood tar product, a coal tar product and an asphalt, each having a viscosity of between 2 and 12, Engler, at 212° F., a specific gravity of between 1.00 and 1.12 and a volatile content not to exceed 3% at 312° F., and at least an equal amount of a fatty acid selected from the group consisting of stearic acid, palmitic acid, myristic acid, lauric acid and jecoric acid, said fatty acid serving as an activator of penetration for the bituminous material.

6. A composition comprising coagulated rubber and the like and a softening agent comprising a bituminous material having a viscosity between 2 and 12, Engler, at 212° F., a specific gravity between 1.00 and 1.12 and a volatile content not to exceed 3% at 325° F., and at least an equal amount of a saturated fatty acid of high molecular weight.

7. A rubber softening agent comprising a bituminous material, a saturated fatty acid of high molecular weight of an amount at least equal to the amount of bituminous material, and from 3% to 10% of pine tar oil, in which the fatty acid serves as an activator of penetration for the bituminous material.

8. The method of treating crude coagulated rubber and the like which comprises incorporating therein prior to milling a solution of a bituminous material, a fatty acid of high molecular weight of an amount at least equal to the amount of bituminous material, and from 3% to 10% of pine tar oil, said fatty acid serving as an activator of penetration for the bituminous material.

9. A composition comprising coagulated rubber and the like and a softening agent comprising a bituminous material, a saturated fatty acid of high molecular weight of an amount at least equal to the amount of bituminous material, and from 3% to 10% of pine tar oil.

ARTHUR E. WARNER.